United States Patent
Hoshuyama (10) Patent No.: US 7,418,132 B2
(45) Date of Patent: Aug. 26, 2008

(54) SIGNAL PROCESSING APPARATUS, SIGNAL PROCESSING PROGRAM AND ELECTRONIC CAMERA

(75) Inventor: Hideo Hoshuyama, Takatsu-ku (JP)

(73) Assignee: Nikon Corporation, Tokyo (JP)

(*) Notice: Subject to any disclaimer, the term of this patent is extended or adjusted under 35 U.S.C. 154(b) by 858 days.

(21) Appl. No.: 10/876,688

(22) Filed: Jun. 28, 2004

(65) Prior Publication Data

US 2005/0001913 A1 Jan. 6, 2005

(30) Foreign Application Priority Data

Jul. 1, 2003 (JP) ............................. 2003-189521

(51) Int. Cl.
G06K 9/00 (2006.01)
(52) U.S. Cl. ...................... 382/167; 382/162
(58) Field of Classification Search .............. 382/162, 382/167, 274; 348/222.1, 223.1, 225.1, E9.01; 358/518, 520, 3.1, 3.2, 1.2; 347/240, 247, 347/251

See application file for complete search history.

(56) References Cited

U.S. PATENT DOCUMENTS

| | | | |
|---|---|---|---|
| 6,184,915 B1 * | 2/2001 | Atsumi et al. ............ | 347/251 |
| 6,295,382 B1 | 9/2001 | Karanovic ............... | 382/261 |
| 6,434,266 B1 * | 8/2002 | Kanno et al. ............. | 382/162 |
| 6,856,704 B1 | 2/2005 | Gallagher et al. ........ | 382/263 |
| 6,927,877 B2 * | 8/2005 | Kanno et al. ............. | 358/3.1 |
| 7,092,573 B2 | 8/2006 | Luo et al. ................ | 382/228 |
| 2002/0172431 A1 | 11/2002 | Atkins et al. ............. | 382/260 |
| 2003/0026495 A1 | 2/2003 | Gondek et al. ........... | 382/261 |

FOREIGN PATENT DOCUMENTS

| | | |
|---|---|---|
| EP | 1 209 621 A2 | 5/2002 |
| EP | 1 318 475 A1 | 6/2003 |
| JP | 05-037776 | 2/1993 |
| JP | 05-174142 | 7/1993 |
| JP | 09-050531 | 2/1997 |
| JP | 2001-109889 | 4/2001 |

OTHER PUBLICATIONS

Ciuc M. et al., "Filtering Noise in Color Images Using Adaptive-Neighborhood Statistics," 2000, Journal of Electronic Imaging, vol. 9(4), pp. 484-494.

* cited by examiner

Primary Examiner—Anh H Do
(74) Attorney, Agent, or Firm—Oliff & Berridge, PLC (57) ABSTRACT

A signal processing apparatus includes a signal processing section applying a spatial frequency filter to a pixel signal to perform a signal processing of noise reduction and/or edge enhancement, and a coefficient correcting section setting a coefficient group of the spatial frequency filter to a correct coefficient group. The coefficient correcting section includes an analyzing section, a correspondence section and a coefficient determining section. The analyzing section sets a local area to include an object pixel of the signal processing, and obtains average color information. A correspondence relation between the average color information and the correct coefficient group is set beforehand in the correspondence setting section. The coefficient determining section checks the correspondence relation of the correspondence setting section on the basis of the average color information obtained by the analyzing section, and adjusts the correct coefficient group used for the pixel of the processing object.

24 Claims, 6 Drawing Sheets

FIG. 3A
LOCAL AREA
CONTAINING
Gb AT CENTER

|   | 0 | 1 | 2 | 3 | 4 | 5 | 6 |
|---|---|---|---|---|---|---|---|
|   | R | G | R | G | R | G | R |
| 0 | G | B | G | B | G | B | G |
| 1 | R | G | R | G | R | G | R |
| 2 | G | B | G | B | G | B | G |
| 3 | R | G | R | G | R | G | R |
| 4 | G | B | G | B | G | B | G |
|   | R | G | R | G | R | G | R |

FIG. 3B
LOCAL AREA
CONTAINING
Gr AT CENTER

|   | 0 | 1 | 2 | 3 | 4 | 5 | 6 |
|---|---|---|---|---|---|---|---|
|   | B | G | B | G | B | G | B |
| 0 | G | R | G | R | G | R | G |
| 1 | B | G | B | G | B | G | B |
| 2 | G | R | G | R | G | R | G |
| 3 | B | G | B | G | B | G | B |
| 4 | G | R | G | R | G | R | G |
|   | B | G | B | G | B | G | B |

FIG. 3C
LOCAL AREA
CONTAINING
B AT CENTER

|   | 0 | 1 | 2 | 3 | 4 | 5 | 6 |
|---|---|---|---|---|---|---|---|
|   | G | R | G | R | G | R | G |
| 0 | B | G | B | G | B | G | B |
| 1 | G | R | G | R | G | R | G |
| 2 | B | G | B | G | B | G | B |
| 3 | G | R | G | R | G | R | G |
| 4 | B | G | B | G | B | G | B |
|   | G | R | G | R | G | R | G |

FIG. 3D
LOCAL AREA
CONTAINING
R AT CENTER

|   | 0 | 1 | 2 | 3 | 4 | 5 | 6 |
|---|---|---|---|---|---|---|---|
|   | G | B | G | B | G | B | G |
| 0 | R | G | R | G | R | G | R |
| 1 | G | B | G | B | G | B | G |
| 2 | R | G | R | G | R | G | R |
| 3 | G | B | G | B | G | B | G |
| 4 | R | G | R | G | R | G | R |
|   | G | B | G | B | G | B | G |

SIGNAL PROCESSING APPARATUS, SIGNAL PROCESSING PROGRAM AND ELECTRONIC CAMERA

CROSS REFERENCE TO RELATED APPLICATION

This application is based upon and claims the benefit of priority from Japanese Patent Application No. 2003-189521, filed on Jul. 1, 2003, the entire contents of which are incorporated herein by reference.

BACKGROUND OF THE INVENTION

1. Field of the Invention

The present invention relates to a signal processing technology applied to an imaging apparatus such as an electronic camera, a video camera, a scanner and a printer.

2. Description of the Related Art

In general, an imaging apparatus has something that applies a spatial frequency filter to a pixel signal in order to perform edge enhancement and noise reduction.

For example, as a spatial frequency filter for noise reduction, there is known a method in which a 3×3 pixel block around the pixels of the processing object is cut out, having the pixels of the processing object in the center, the pixel block is multiplied by a coefficient group of 1 1 1
1 2 1
1 1 1, and a weighted average is taken.

Besides, for example, as a spatial frequency filter for edge enhancement, there is known a method in which a 3×3 pixel block around the pixels of the processing object is cut out, having the pixels of the processing object in the center, the pixel block is multiplied by a coefficient group of

−1 −1 −1
−1 9 −1
−1 −1 −1, and addition is done.

It is also publicly known that the intensity of the noise reduction and edge enhancement can be adjusted by performing adjustments (including size adjustment of the pixel blocks) of these coefficient groups.

Japanese Unexamined Patent Publication No. Hei. 5-174142 discloses a technique in which a pixel signal of a processing object is decomposed into signals of lightness, color saturation and hue, and edge enhancement and edge relaxation are performed for the signals of lightness and color saturation.

In the foregoing related arts, edge enhancements and the noise reductions are uniformly performed for all pixels. Thus, it had been necessary to perform edge enhancement and noise reduction moderately so that failures do not occur in processing results of images of various patterns. Thus, sufficient signal processing could not be performed for places where edge enhancement is desired to be actively performed or places where noise reduction is desired to be performed more intensely, and so it had been difficult to obtain optimum processing results.

SUMMARY OF THE INVENTION

It is an object of the invention to analyze a pixel signal and to adjust the intensity of a spatial frequency filter in accordance with its analysis result.

In the case where the spatial frequency filter is adjusted in accordance with the above object, there arises a problem that a signal processing varies excessively by noise included in the pixel signal, and the noise becomes noticeable by the variation.

Further, in the case where the signal processing is changed in a unit of one pixel, many places where the signal processing is extensively changed occur on a screen. There arises a problem that in these places, unevenness of the signal processing becomes a false signal (noise) and noticeable.

Then, it is another object of the invention to improve the problems of the noise when the intensity of the spatial frequency filter is adjusted.

Hereinafter, the invention will be described.

A signal processing apparatus of the invention includes a signal processing section for applying a spatial frequency filter to an inputted pixel signal to perform a signal processing of noise reduction and/or edge enhancement, and a coefficient correcting section for setting a coefficient group of the spatial frequency filter to a correct coefficient group.

Particularly, the coefficient correcting section includes an analyzing section, a correspondence setting section and a coefficient determining section as set forth below.

First, the analyzing section sets a local area so as to include an object pixel of the signal processing, and processes plural pixel signals in the local area to obtain average on color information (hereinafter referred to as "average color information"). As an arithmetic processing for this averaging, it is preferable to perform, for example, an arithmetic processing to obtaining an average value, a weighted average value, a median value, a most frequent value, an average value without the maximum and minimum values, or the like.

A correspondence relation between the "average color information" and the "correct coefficient group" is set previously in the correspondence setting section.

The coefficient determining section checks the correspondence relation of the correspondence setting section on the basis of the average color information obtained by the analyzing section, and adjusts the correct coefficient group used for the pixel of the processing object.

In the foregoing signal processing, the coefficient group of the spatial frequency filter is changed on the basis of the color information of an image. As a result, for example, noise reduction is selectively strengthened in the hue and color saturation in which noise is noticeable, so that a visual feeling of noise in the image can be improved for the better. Besides, for example, the edge enhancement is selectively strengthened in the hue and color saturation where a gradation change is noticeable, so that a feeling of sharpness in the image can be effectively increased.

Further, in the foregoing signal processing, the spatial frequency filter (that is, the correct coefficient group) is adjusted on the basis of the average color information in the local area, and not on the basis of the color information of one pixel of the processing object. In this case, even if many noises are included in the pixel of the processing object, the average color information as the average value in the local area is not directly influenced by the noises. Thus, the coefficient of the spatial frequency filter hardly changes sensitively by the noises of the pixel signals, and a phenomenon in which the noises are noticeable can be improved for the better.

Further, in adjacent pixels, most of the ranges in the local areas overlap with each other. Thus, the average color information is not abruptly changed between the adjacent pixels. From this, the spatial frequency filter is not extensively changed between the adjacent pixels, and a phenomenon in which a false signal (noise) is generated by an extensive change of the spatial frequency filter is improved for the better.

In a place where various color noises are generated at random, the dispersion and range of the color information in the local area become large. In such a place, various color noises are averaged, so that the average color information becomes close to an achromatic color. Then, it is preferable that the places where color noises are generated are detected using these features, and the coefficient of the spatial frequency filter is adjusted in a direction of reducing the color noises in those places.

Preferably, the coefficient correcting section adjusts the correct coefficient group in a direction of strengthening the edge enhancement when the average hue in the local area including the pixel of the processing object is green or cyan. On the other hand, the coefficient correcting section adjusts the correct coefficient group in a direction of strengthening the noise reduction when the hue is red or yellow.

In the foregoing signal processing, edge enhancement is selectively strengthened in places having a green or a cyan. In general, since human beings have high visual sensitivity for gradation changes in green or cyan, the feeling of sharpness in the image can be effectively enhanced by selectively strengthening the edge enhancement in these hues.

There is a high possibility that places with green in a subject such as landscapes are detailed portions where minute image changes are concentrated, such as bushes or a grassy plain. Thus, by selectively strengthening the edge enhancement in the place with green, the gradation change of the detailed portion is emphasized and the image with a plenty of information can be obtained.

On the other hand, in the foregoing signal processing, noise reduction is selectively strengthened in places with red or yellow. In general, in red and yellow places, uneven color saturation (turbidity of color) due to the noise is apt to become noticeable. Thus, by selectively strengthening noise reduction in these places, uneven color saturation of the image can be excellently improved for the better.

Besides, in subjects such as people, there is a high possibility that places including much red and yellow (yellow, pink, dark brown, blackish brown, etc.) skin portions where gradation is gently changed. Accordingly, by selectively strengthening noise reduction in the places including red and/or yellow, the feeling of noise in the skin portions is reduced, and it becomes possible to excellently reproduce the gentle gradation change in the skin portion.

Another signal processing apparatus of the invention includes a signal processing section applying a spatial frequency filter to an inputted pixel signal to perform a signal processing of noise reduction and/or edge enhancement, and a coefficient correcting section setting a coefficient group of the spatial frequency filter to a correct coefficient group.

Particularly, the coefficient correcting section includes an analyzing section, a correspondence setting section and a coefficient determining section as set forth below.

First, the analyzing section sets a local area so as to include an object pixel of the signal processing, and processes plural pixel signals in the local area to obtain average luminance information (hereinafter referred to as "average luminance information"). As this averaging arithmetic processing, it is preferable to perform, for example, an arithmetic processing of obtaining an average value, a weighted average value, a median value, a most frequent value, an average value except for the maximum and minimum, or the like.

A correspondence relation between the "average luminance information" and the "correct coefficient group" is set beforehand in the correspondence setting section.

The coefficient determining section checks the correspondence relation on the basis of the average luminance information obtained by the analyzing section, and adjusts the correct coefficient group used for the pixel of the processing object.

In the foregoing signal processing, the coefficient group of the spatial frequency filter is changed on the basis of the color information of the image. As a result, for example, by selectively strengthening the noise reduction in a place having such lightness that noise is noticeable, a visual feeling of noise in the image can be improved for the better. Besides, for example, by selectively strengthening the edge enhancement in a place having such brightness that a gradation change is noticeable, a feeling of sharpness in the image can be effectively improved.

Further, in the foregoing signal processing, the spatial frequency filter (that is, the correct coefficient group) is adjusted on the basis of the average luminance information in the local area, not the brightness information of one pixel of the processing object. In this case, even if many noises are included in the pixel of the processing object, the average luminance information as the average value is not directly influenced by the noises. Thus, the spatial frequency filter hardly changes sensitively by the noises of the pixel signals, and a phenomenon in which the noises are noticeable can be improved for the better.

Further, in adjacent pixels, most of the ranges in the local areas overlap with each other. Thus, the average luminance information is not abruptly changed between the adjacent pixels. From this, the spatial frequency filter is not extensively changed between the adjacent pixels, and a phenomenon in which a false signal (noise) is generated by an extensive change of the spatial frequency filter is improved for the better.

In a detailed portion (minute pattern such as hair) of the image or in the vicinity of an edge, the brightness information having a large difference between light and shade is included in the local area. The average luminance information in this case does not reflect each piece of brightness information having large variations of light and shade and becomes intermediate brightness information. As a result, in the detailed portion of the image, such an operation as to change the signal processing in pixel units hardly occurs, and it becomes possible to cause minute and complicated changes of light and shade of the detailed portion to faithfully remain.

Preferably, the coefficient correcting section adjusts the correct coefficient group in a direction of strengthening the edge enhancement when the average luminance in the local area including the pixel of the processing object falls in a range of a predetermined intermediate gradation. On the other hand, at other times, the coefficient correcting section adjusts the correct coefficient group in a direction of strengthening the noise reduction.

In the foregoing signal processing, when the brightness in the local area is almost uniform and falls in the range of the specified intermediate gradation, the contour in the place with the processing object is clearly emphasized. As a result, in the image having such low contrast that the brightness is converged to an intermediate gradation, it becomes possible to emphasize the sharpness of the gradation change, and the excellent image with a high impact can be obtained.

On the other hand, when the brightness in the local area uniformly falls outside the range of the intermediate gradation (bright part or dark part), the noise of the place with the processing object is intensely removed. Accordingly, it is possible to adequately prevent such harmful effects that the signal level of the pixel signal is saturated in the bright part by the edge enhancement, and the noise in the dark part becomes noticeable.

Another signal processing apparatus of the invention includes a signal processing section applying a spatial frequency filter to an inputted pixel signal to perform a signal processing of noise reduction and/or edge enhancement, and a coefficient correcting section setting a coefficient group of the spatial frequency filter to a correct coefficient group.

Particularly, the coefficient correcting section includes an analyzing section, a correspondence setting section and a coefficient determining section as set forth below.

First, the analyzing section sets a local area so as to include an object pixel of the signal processing, and processes plural pixel signals in the local area to obtain the degree of flatness in a pixel space.

A correspondence relation between the "degree of flatness" and the "correct coefficient group" is set beforehand in the correspondence setting section.

The coefficient determining section checks the correspondence relation on the basis of the degree of flatness obtained by the analyzing section, and adjusts the correct coefficient group used for the pixel of the processing object.

In the foregoing signal processing, the coefficient group of the spatial frequency filter is changed in accordance with the degree of flatness in the local area. As a result, for example, in a place where a noise level is large and the degree of flatness is low, it becomes possible to selectively strengthen the noise reduction. Besides, for example, it also becomes possible to selectively strengthen the edge enhancement for a place having a low degree of flatness and corresponding to a detailed portion (minute pattern such as hair) of the image or an edge portion.

It is also possible to discriminate between the noise portion made of minute amplitudes and the detailed portion made of intermediate or higher amplitudes based on the degree of the flatness. By the discrimination of the degree of flatness as stated above, it becomes possible to strengthen the noise reduction in the noise portion and to strengthen the edge enhancement in the detailed portion.

In a place where various brightness noises are generated at random, the dispersion of brightness information in the local area and the range of <maximum brightness-minimum brightness> in the local area become large. Then, the place having many brightness noises is judged by detecting the dispersion of the brightness information and range as a degree of flatness in the local area, and in the place having the many brightness noises, the coefficient of the spatial frequency filter may be adjusted in the "direction of strengthening the noise reduction" and/or "direction of weakening the edge enhancement".

Preferably, as the degree of flatness in the local area including the pixel of the processing object becomes high, the coefficient correcting section adjusts the correct coefficient group in the direction of strengthening the noise reduction. On the other hand, as the degree of flatness becomes low, the coefficient correcting section adjusts the correct coefficient group in the direction of strengthening the edge enhancement.

In the foregoing signal processing, the noise reduction is strengthened in a flat area, and the edge enhancement is strengthened in a nonflat area (detailed part, edge part, etc.). As a result, while the flat area is reproduced at a higher S/N ratio, the sharpness of gradation can be enhanced in the nonflat area.

Another signal processing apparatus of the invention includes a signal processing section applying a spatial frequency filter to an inputted pixel signal to perform a signal processing of noise reduction and/or edge enhancement, and a coefficient correcting section setting a coefficient group of the spatial frequency filter to a correct coefficient group.

Particularly, the coefficient correcting section includes an analyzing section, an aberration judging section and a coefficient determining section as set forth below.

First, the analyzing section sets a local area so as to include an object pixel of the signal processing, and calculates average color information and degree of flatness on the basis of plural pixel signals in the local area.

The aberration judging section judges whether conditions of (1) the average color information falls in a hue range of one of green and magenta, and (2) the degree of flatness is lower than a previously determined threshold and indicates a color boundary or an edge part are satisfied.

When both of the conditions (1) and (2) are satisfied, the coefficient determining section adjusts the correct coefficient group used for the pixel of the processing object in a "direction of strengthening the noise reduction" and/or "direction of weakening the edge enhancement".

In general, there is a high possibility that a place satisfying both the conditions (1) and (2) is a place where chromatic aberration of magnification appears. Accordingly, in this place, by strengthening the noise reduction or weakening the edge enhancement, the chromatic aberration of magnification appearing in the image can be made unnoticeable.

Another signal processing apparatus of the invention includes a signal processing section applying a spatial frequency filter to an inputted pixel signal to perform a signal processing of noise reduction and/or edge enhancement, and a coefficient correcting section setting a coefficient group of the spatial frequency filter to a correct coefficient group.

Particularly, the coefficient correcting section includes an analyzing section, a skin judging section and a coefficient determining section as set forth below.

First, the analyzing section sets a local area so as to include an object pixel of the signal processing, and calculates average color information, average luminance information and degree of flatness on the basis of plural pixel signals in the local area.

The skin judging section judges whether conditions of (1) the average color information falls in a previously determined hue range of a flesh color, (2) the average luminance information falls in a brightness range of a skin, and (3) the degree of flatness indicates a flatter state than a previously determined threshold and falls in a range of the degree of flatness of the skin are satisfied.

When all the conditions (1) to (3) are satisfied in the skin judging section, the coefficient determining section adjusts the correct coefficient group used for the pixel of the processing object in a "direction of strengthening the noise reduction" and/or "direction of weakening the edge enhancement".

In general, there is a high possibility that a place satisfying all the conditions (1) to (3) is a skin portion of a figure subject. Accordingly, by selectively strengthening the noise reduction or weakening the edge enhancement in this place, it is possible to reduce the noise of the skin portion and to more faithfully reproduce the gradation change in the color of a cheek or the like.

Another signal processing apparatus of the invention includes a signal processing section applying a spatial frequency filter to an inputted pixel signal to perform a signal processing of noise reduction and/or edge enhancement, and a coefficient correcting section setting a coefficient group of the spatial frequency filter to a correct coefficient group.

Particularly, the coefficient correcting section includes an analyzing section, a blue sky judging section and a coefficient determining section as set forth below.

First, the analyzing section sets a local area so as to include an object pixel of the signal processing, and calculates average color information, average luminance information and degree of flatness on the basis of plural pixel signals in the local area.

The blue sky judging section judges whether conditions of
(1) the average color information falls in a previously determined hue range of a blue sky,
(2) the average luminance information indicates a brighter state than a previously determined threshold and falls in a brightness range of the blue sky, and
(3) the degree of flatness indicates a flatter state than a previously determined threshold and falls in a range of the degree of flatness of the blue sky are satisfied.

When all the conditions (1) to (3) are satisfied in the blue sky judging section, the coefficient determining section adjusts the correct coefficient group used for the pixel of the processing object in a "direction of strengthening the noise reduction" and/or "direction of weakening the edge enhancement".

In general, there is a high possibility that a place satisfying all the conditions (1) to (3) is the blue sky portion. Accordingly, by selectively strengthening the noise reduction or weakening the edge enhancement in this place, it is possible to reduce the noise of the blue sky portion and to more faithfully reproduce the gradation change of the blue sky.

Another signal processing apparatus of the invention includes a signal processing section applying a spatial frequency filter to an inputted pixel signal to perform a signal processing of noise reduction and/or edge enhancement, and a coefficient correcting section setting a coefficient group of the spatial frequency filter to a correct coefficient group.

Particularly, the coefficient correcting section includes an analyzing section, a correspondence setting section and a coefficient determining section as set forth below.

First, the analyzing section sets a local area so as to include an object pixel of the signal processing, and calculates feature information (hereinafter referred to as "local feature information") in the local area including at least one of average color information, average luminance information and degree of flatness on the basis of plural pixel signals in the local area.

A correspondence relation between the "local feature information" and the "correct coefficient group" is set beforehand in the correspondence setting section.

The coefficient determining section checks the correspondence relation on the basis of the local feature information obtained by the analyzing section, and adjusts the correct coefficient group used for the pixel of the processing object.

A signal processing program of the invention is characterized by causing a computer to function as the signal processing section and the coefficient correcting section as described above.

By using the signal processing program, the computer can be made to function as the signal processing apparatus of the invention.

An electronic camera of the invention includes an image pickup section taking an image of a subject to generate a pixel signal, and a signal processing apparatus applying a spatial frequency filter to the pixel signal generated by the image pickup section. Particularly, a feature is that the signal processing apparatus is the signal processing apparatus as described above.

In the structure as described above, with respect to the local area which is set to include the processing object pixel, the average color information, the average luminance information and the degree of flatness are obtained, and the correct coefficient group of the spatial frequency filter (noise reduction and/or edge enhancement) is adjusted on the basis of the feature information in the local area as stated above.

Accordingly, an excellent spatial frequency filter processing can be performed in accordance with the features in the local area.

Further, in the process of averaging in the local area, the noise of the feature information can be suppressed. As a result, there is little fear that an unexpected spatial frequency filter is applied by the noise of the pixel signal.

Further, between the adjacent pixels, since most of the set local areas overlap with each other, the feature information is not abruptly changed. Accordingly, there is little fear that the coefficient group of the spatial frequency filter is abruptly changed between the adjacent pixels. As a result, it is possible to suitably suppress such harmful effects that a false boundary and a false color are generated by an extensive change of the spatial frequency filter.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DETAILED DESCRIPTION OF THE PREFERRED EMBODIMENTS

In the following, the embodiments of the present invention will be described in reference to the drawings.

Embodiment

[Description of Structure of Embodiment]

Figure 1:
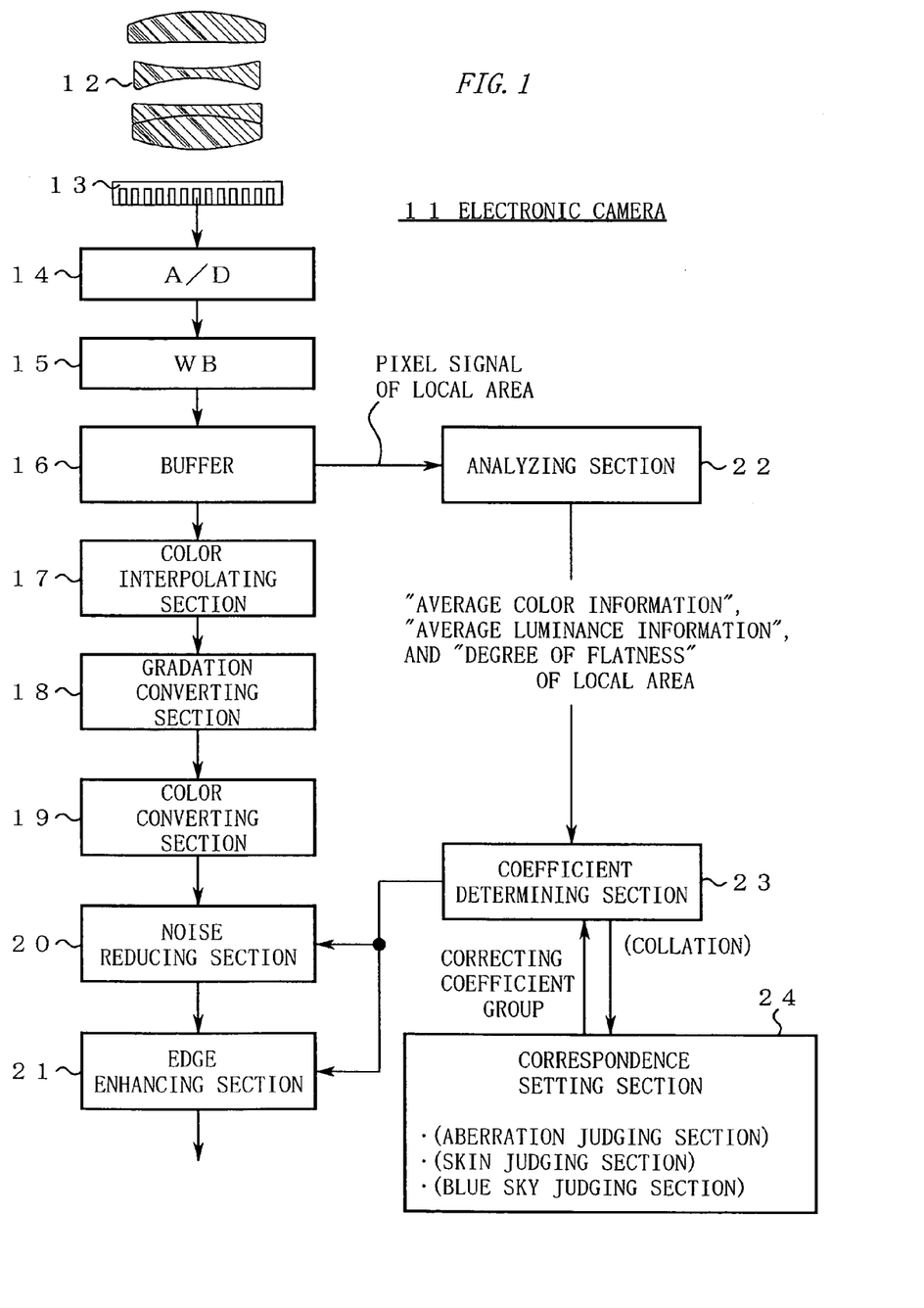
FIG. 1 is a block diagram showing an electronic camera 11 of an embodiment.

FIG. 1 is a block diagram showing an electronic camera 11 of this embodiment.

In FIG. 1, a taking lens 12 is mounted in the electronic camera 11. An image pickup plane of an image pickup element 13 is disposed in an image space of the taking lens 12. A pixel signal scan-outputted from the image pickup element 13 is processed through an A/D conversion part 14 and a white balance adjustment part 15, and then is stored as image data in a buffer 16.

The image data in the buffer 16 is processed through a color interpolating section 17, a gradation converting section 18, a color converting section 19, a noise reduction section 20, and an edge enhancing section 21, and then is compressed and recorded in a not-shown recording medium.

Further, the electronic camera 11 includes an analyzing section 22, a coefficient determining section 23, and a correspondence setting section 24.

The analyzing section 22 and the coefficient determining section 23 are constructed of a microprocessor or the like. On the other hand, the correspondence section 24 is constructed of a memory or the like.

An aberration judging section, a skin judging section, and a blue sky judging section of the claims are included in the correspondence setting section 24.

[Description of Operation of Embodiment]

Figure 2A:
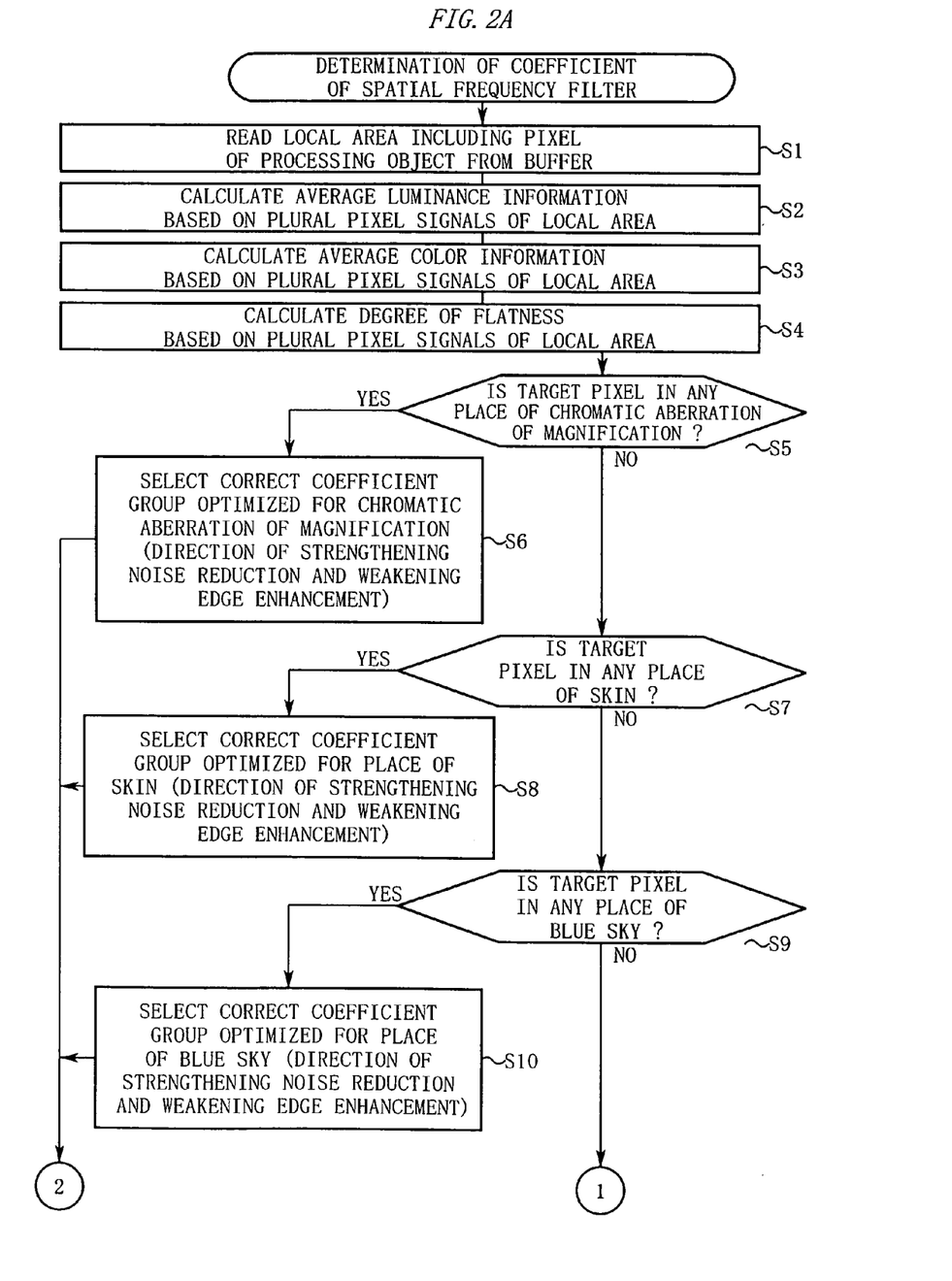
FIGS. 2A and 2B are flowcharts of an operation to determine a coefficient group of a spatial frequency filter.
Figure 2B:
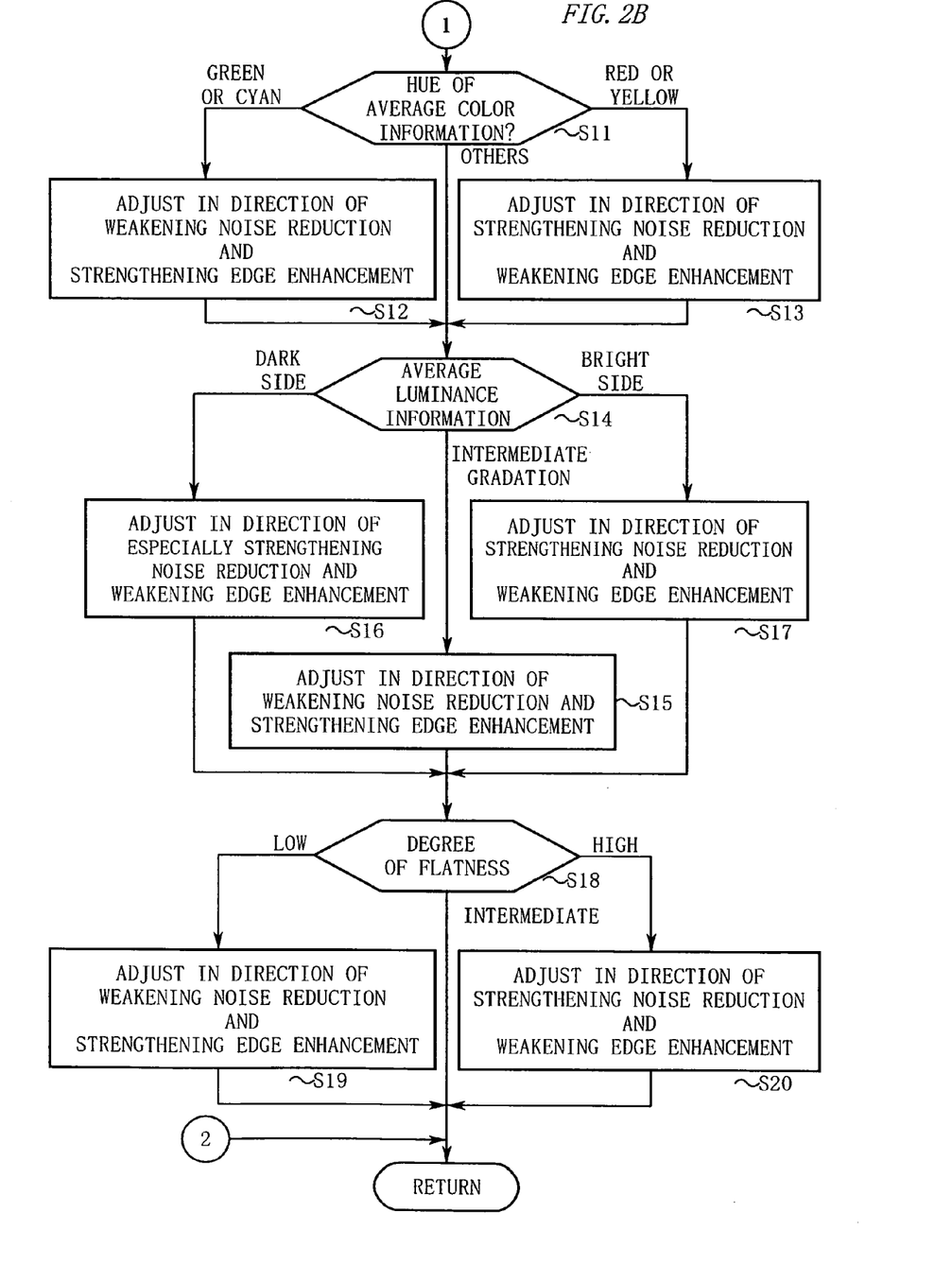

FIGS. 2A and 2B are flowcharts showing an operation in which the electronic camera 11 determines a correct coefficient group for noise reduction and edge enhancement in pixel units.

Hereinafter, the characteristic operation of the invention will be described in step order shown in FIGS. 2A and 2B.

Step S1: The analyzing section 22 sets a local area including a pixel as a processing object of a signal processing. The analyzing section 22 reads out plural pixel signals positioned in the local area from the buffer 16.

FIGS. 3A to 3D are views showing examples in the local area. In the examples, the local area is set to a range of 9 pixels horizontal by 7 pixels vertical around the pixel (pixel indicated by a thick letter) of the processing object. It is preferable that the size in the local area is expanded or contracted in accordance with the number of pixels in all directions of image data, output resolution, printing size or display size.

In the case where the processing object is positioned near an end of a screen, the setting range in the local area protrudes from the image data.

In such a case, it is preferable that pixel folding is performed with respect to the end of the screen as a symmetrical axis, and a blank portion in the local area is filled with the folded pixels.

The blank portion in the local area may be filled by using the pixel signals of the processing object, pixel signals in the neighborhood, median values or the like.

Step S2: The analyzing section 22 obtains average luminance information on the basis of the plural pixel signals included in the local area and in accordance with a following procedure.

First, the analyzing section 22 adds the plural pixel signals in the local area for the respective colors, and obtains added values $T\sigma(R)$, $T\sigma(B)$ and $T\sigma(G)$ for the respective colors.

Figure 3A:
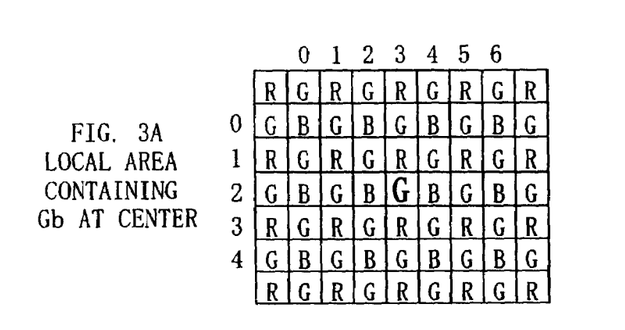
FIGS. 3A to 3D are views showing examples of a local area.

For example, as shown in FIG. 3A, in the case where a G pixel (hereinafter referred to as "Gb") in a row B of Bayer arrangement is the processing object, the analyzing section 22 calculates the added values $T\sigma(R)$, $T\sigma(B)$ and $T\sigma(G)$ for the respective colors by following expressions. (Where, a pixel signal at vertical position y and horizontal position x is denoted by Cyx. For example, C23 denotes the pixel signal at the center in the local area. The same shall apply hereinafter.)

Figure 3B:
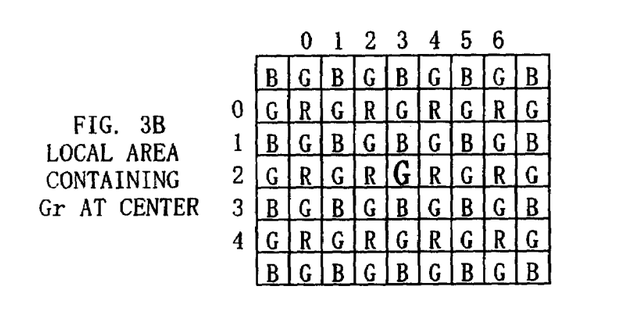

$T\sigma(R)=(C11+C13+C15+C31+C33+C35)$ $T\sigma(B)=(C00+C02+C04+C06+C20+C22+C24+C26+C40+C42+C44+C46)$ $T\sigma(G)=(C01+C03+C05+C10+C12+C14+C16+C21+C23+C25+C30+C32+C34+C36+C41+C43+C45)$ Besides, for example, as shown in FIG. 3B, in the case where a G pixel (hereinafter referred to as "Gr") in a row R of the Bayer arrangement is the processing object, the analyzing section 22 calculates the added values $T\sigma(R)$, $T\sigma(B)$ and $T\sigma(G)$ for the respective colors by following expressions.

Figure 3C:
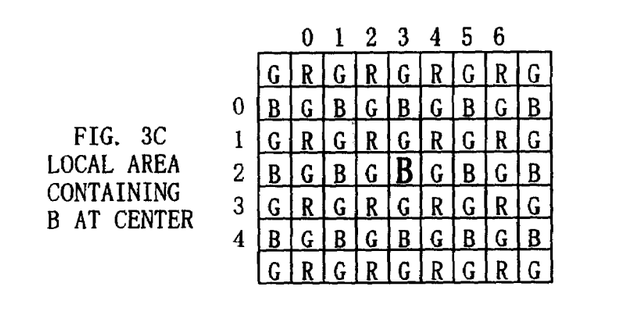

$T\sigma(R)=(C00+C02+C04+C06+C20+C22+C24+C26+C40+C42+C44+C46)$ $T\sigma(B)=(C11+C13+C15+C31+C33+C35)$ $T\sigma(G)=(C01+C03+C05+C10+C12+C14+C16+C21+C23+C25+C30+C32+C34+C36+C41+C43+C45)$ Besides, for example, as shown in FIG. 3C, in the case where a B pixel in the Bayer arrangement is the processing object, the analyzing section 22 calculates the added values $T\sigma(R)$, $T\sigma(B)$ and $T\sigma(G)$ for the respective colors by following expressions.

Figure 3D:
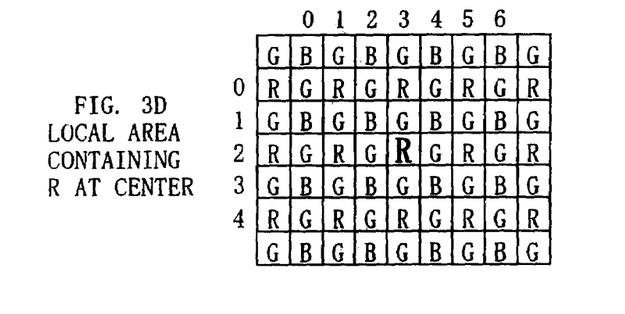

$T\sigma(R)=(C10+C12+C14+C16+C30+C32+C34+C36)$ $T\sigma(B)=(C01+C03+C05+C21+C23+C25+C41+C43+C45)$ $T\sigma(G)=(C00+C02+C04+C06+C11+C13+C15+C20+C22+C24+C26+C31+C33+C35+C40+C42+C44+C46)$ Besides, for example, as shown in FIG. 3D, in the case where an R pixel in the Bayer arrangement is the processing object, the analyzing section 22 calculates the added values $T\sigma(R)$, $T\sigma(B)$ and $T\sigma(G)$ for the respective colors by following expressions.

$T\sigma(R)=(C01+C03+C05+C21+C23+C25+C41+C43+C45)$ $T\sigma(B)=(C10+C12+C14+C16+C30+C32+C34+C36)$ $T\sigma(G)=(C00+C02+C04+C06+C11+C13+C15+C20+C22+C24+C26+C31+C33+C35+C40+C42+C44+C46)$ The analyzing section 22 divides the total sum of the added values $T\sigma(R)$, $T\sigma(B)$ and $T\sigma(G)$ for the respective colors by the number of the added pixels and calculates average luminance information. In this case, the ratio of visual sensitivities for the respective colors (for example, R:G:B=3:6:1) is made a weight and a weighted average is taken, and as a result, the average luminance information may be obtained with consideration given to the visual sensitivity.

Step 3: Subsequently, the analyzing section 22 calculates an average chromaticity coordinate in the local area as average color information by using following expressions.

$(R/G, B/G)=(T\sigma(R)/T\sigma(G), T\sigma(B)/T\sigma(G))$

It is preferable that the added values $T\sigma(R)$, $T\sigma(B)$ and $T\sigma(G)$ for the respective colors are normalized in accordance with the number of the added pixels.

Figure 4:
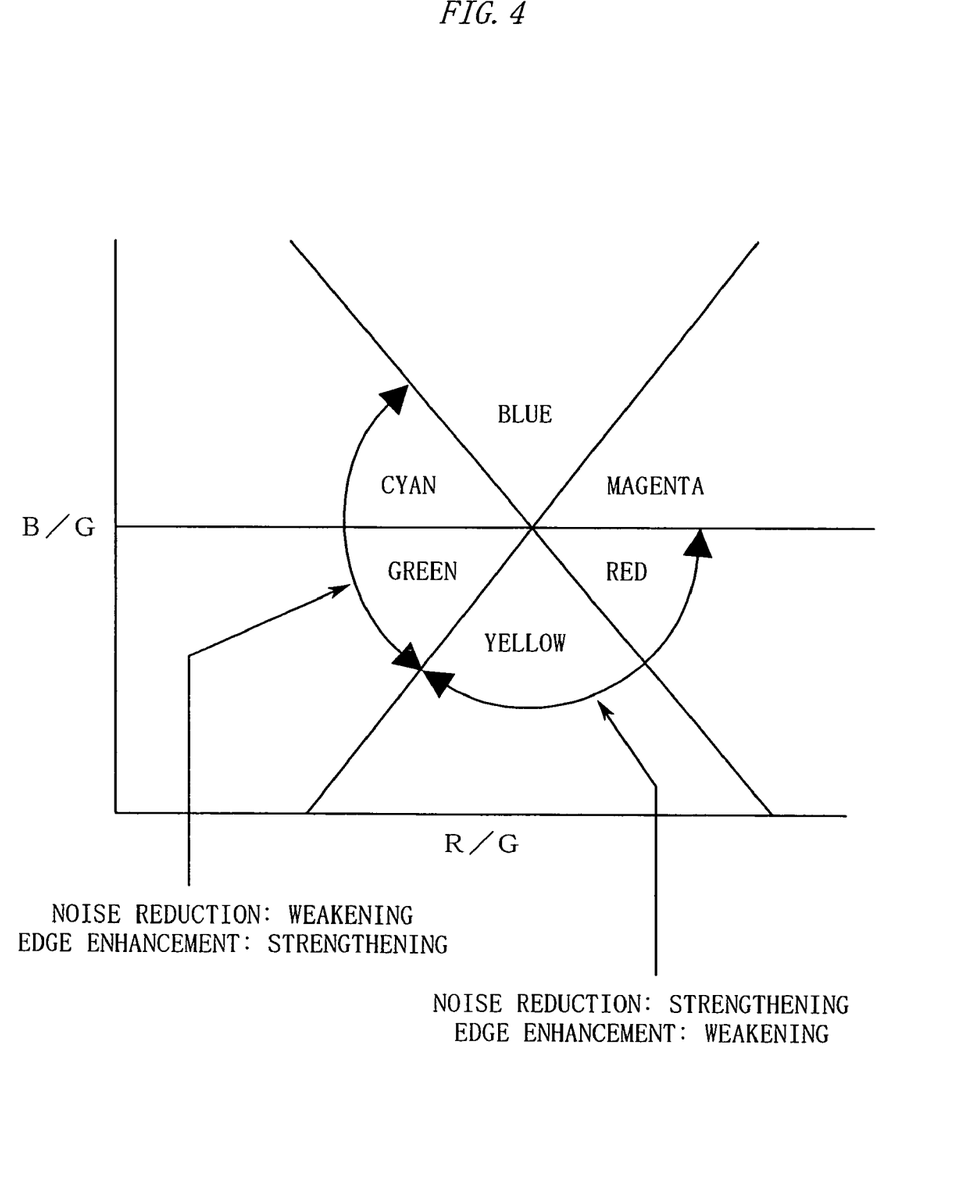
FIG. 4 is a view showing an example of a chromaticity coordinate.

From the chromaticity coordinate (R/G, B/G) obtained in this way, the hue (see FIG. 4) in the local area and the color saturation can be recognized.

Step 4: Further, the analyzing section 22 obtains the degree of flatness in the local area by following procedures.

Here, for simplification of description, the description will be given of the case (see FIG. 3A) in which the Gb pixel is located at the center in the local area. With respect to other cases, when a similar calculation is performed in consideration of the color arrangement in the local area, the degree of flatness can be obtained.

(1) Area differences UD(R), UD(B) and UD(G) in a vertical direction are obtained.

$$UD(R)=|(C11+C13+C15)\cdot(C31+C33+C35)|$$

$$UD(B)=|(C00+C02+C04+C06)\cdot(C40+C42+C44+C46)|$$

$$UD(G)=|(C01+C03+C05+C10+C12+C14+C16)\cdot(C30+C32+C34+C36+C41+C43+C45)|$$

(2) Area differences LR(R), LR(B) and LR(G) in a horizontal direction are obtained.

$$LR(R)=|(C11+C31)\cdot(C15+C35)|$$

$$LR(B)=|(C00+C02+C20+C22+C40+C42)\cdot(C04+C06+C24+C26+C44+C46)|$$

$$LR(G)=|(C01+C10+C12+C21+C30+C32+C41)\cdot(C05+C14+C16+C25+C34+C36+C45)|$$

(3) Area differences AN1(R), AN1 (B) and AN1 (G) in an oblique right-down direction are obtained.

$$AN1(R)=|(C11+C13+C31)\cdot(C15+C33+C35)|$$

$$AN1(B)=|(C00+C02+C04+C20+C22+C40)\cdot(C06+C24+C26+C42+C44+C46)|$$

$$AN1(G)=|(C01+C03+C10+C12+C21+C30)\cdot(C16+C25+C34+C36+C43+C45)|$$

(4) Area differences AN2(R), AN2(B) and AN2(G) in an oblique right-up direction are obtained.

$$AN2(R)=|(C13+C15+C35)\cdot(C11+C31+C33)|$$

$$AN2(B)=|(C02+C04+C06+C24+C26+C46)\cdot(C00+C20+C22+C40+C42+C44)|$$

$$AN2(G)=|(C03+C05+C14+C16+C25+C36)\cdot(C10+C21+C30+C32+C41+C43)|$$

(5) Maximum difference STEP(R), STEP(B) and STEP (G) for the respective colors are obtained.

$$STEP(R)=MAX(UD(R),LR(R),AN1(R),AN2(R))$$

$$STEP(B)=MAX(UD(B),LR(B),AN1(B),AN2(B))$$

$$STEP(G)=MAX(UD(G),LR(G),AN1(G),AN2(G))$$

(6) An average value of the maximum differences STEP (R), STEP(B) STEP(G) for the respective colors is calculated. In this case, an average value may be obtained with consideration given to visual sensitivity by taking a weighted average using, as a weight, a ratio of the visual sensitivities for the respective colors (for example, R:G:B=3:6:1).

As the average value of the maximum differences obtained in this way becomes large, it can be estimated that the degree of flatness in the local area becomes low. On the contrary, as the average value of the maximum difference becomes small, it can be estimated that the degree of flatness in the local area becomes high.

Step S5: The coefficient determining section 23 acquires the information of the average luminance information, the average color information and the degree of flatness from the analyzing section 22.

The coefficient determining section 23 consults the correspondence setting section 24 about the information. The correspondence setting section 24 checks the information against conditions (1) and (2) set forth below, and judges whether the pixel of the processing object is a place with a chromatic aberration of magnification.

(1) The average color information falls in a hue range of one of green and magenta.
(2) The degree of flatness is lower than a previously determined threshold, and indicates a color boundary or an edge part.

It is preferable that the threshold here is set to the degree of flatness at which the chromatic aberration of magnification starts to become noticeable.

When both the conditions (1) and (2) are satisfied, the coefficient section 23 judges that the processing part is the place with occurrence of the chromatic aberration of magnification, and causes the operation to proceed to step S6.

At other times, the coefficient determining section 23 causes the operation to proceed to step S7.

The judgment may be made more certainly as to whether the processing object is the place with occurrence of the chromatic aberration of magnification by adding conditions (3) and (4) set forth below.

(3) The local area is the peripheral part of the screen.
(4) The possibility of occurrence of the chromatic aberration of magnification is high from information (focal distance, aberration information, etc.) of a photographing optical system.

Step 6: In this step, there is a high possibility that the pixel of the processing object is a place where the chromatic aberration of magnification occurs. Then, the coefficient determining section 23 selects the correct coefficient group optimized for the chromatic aberration of magnification, and transmits it to the noise reducing section 20 and the edge enhancing section 21. The correct coefficient group may be suitably determined by subjectively evaluating the conspicuousness of the chromatic aberration of magnification after the signal processing.

As a general adjustment tendency, the spatial frequency filter of the noise reducing section 20 is adjusted by this correct coefficient group in the direction of strengthening the noise reduction. On the other hand, the spatial frequency filter of the edge enhancement 21 is adjusted in the direction of weakening the edge enhancement.

By the adjustment as stated above, the signal processing to make the chromatic aberration of magnification unnoticeable is performed for the pixel signal of the processing object.

Step 7: The coefficient determining section 23 consults the correspondence setting section 24 about the average luminance information, the average color information, and the degree of flatness. The correspondence setting section 24 checks the information against conditions (1), (2) and (3) set forth below, and judges whether the pixel of the processing object is a skin portion.

(1) The average color information falls in a previously determined hue range of a flesh color.
(2) The average luminance information falls in a brightness range of a skin.
(3) The degree of flatness is higher than a previously determined threshold and falls in a range of the degree of flatness of the skin.

It is preferable that image data of the skin is collected from various photographing results, and the threshold here is determined from the image data.

When all the conditions (1) to (3) are satisfied, the coefficient determining section 23 judges that the processing object is the skin portion, and causes the operation to proceed to step S8.

At other times, the coefficient determining section 23 causes the operation to proceed to step S9.

Step S8: At this step, there is a high possibility that the pixel of the processing object is the skin portion. Then, the coefficient determining section 23 selects the correct coefficient group optimized for the skin portion, and transmits it to the noise reducing section 20 and the edge enhancing section 21. The correct coefficient group may be suitably determined by subjectively evaluate the picture quality of the skin portion after the signal processing.

As a general adjustment tendency, the spatial frequency filter of the noise reducing section 20 is adjusted by the correct coefficient group in the direction of strengthening the noise reduction. On the other hand, the spatial frequency filter of the edge enhancing section 21 is adjusted in the direction of weakening the edge enhancement.

By the operation as stated above, the signal processing to reduce the noise of the skin portion and to faithfully reproduce the delicate gradation change of the skin portion is performed for the pixel signal of the processing object.

Step S9: The coefficient determining section 23 consults the correspondence setting section 24 about the average luminance information, the color information and the degree of flatness. The correspondence setting section 24 checks the information against conditions (1), (2) and (3) set forth below, and judges whether the pixel of the processing object is the blue sky portion.

(1) The average color information falls in a previously determined hue range of the blue sky.
(2) The average luminance information indicates a brighter state than a previously determined threshold, and falls in a brightness range of the blue sky.
(3) The degree of flatness indicates a flatter state than a previously determined threshold and falls in a range of the degree of flatness of the blue sky.

It is preferable that image data of the blue sky is collected from various photographing results and the threshold here is determined from the image data.

When all the conditions (1) to (3) are satisfied, the coefficient determining section 23 judges that the processing object is the place in the blue sky, and causes the operation to proceed to step S10.

At other times, the coefficient determining section 23 causes the operation to proceed to step S11.

Step S10: At this step, there is a high possibility that the pixel of the processing object is the blue sky. Then, the coefficient determining section 23 selects the correct coefficient group optimized for the blue sky, and transmits it to the noise reducing section 20 and the edge enhancing section 21. The correct coefficient group may be suitably determined by subjectively evaluating the picture quality of the blue sky portion after the signal processing.

As a general adjustment tendency, the spatial frequency filter of the noise reducing section 20 is adjusted by this correct coefficient group in the direction of strengthening the noise reduction. On the other hand, the spatial frequency filter of the edge enhancing section 21 is adjusted in the direction of weakening the edge enhancement.

By the operation as stated above, the signal processing to reduce the noise of the blue sky portion and to faithfully reproduce a dedicate gradation change of the blue sky portion is performed for the pixel signal of the processing object.

Step 11: The coefficient determining section 23 checks the average color information against the correspondence relation stored in the correspondence setting section 24, and judges the average hue in the local area.

Here, when the hue of the average color information is green or cyan, the coefficient determining section 23 causes the operation to proceed to step S12.

On the other hand, when the hue of the average color information is red or yellow, the coefficient determining section 23 causes the operation to proceed to step S13.

In the case where the color saturation of the average color information is lower than the predetermined threshold, it is judged that the area has a color close to an achromatic color and it is preferable to bypass the adjustment of step S11 to S13.

Step S12: At this step, the average hue in the local area is green or cyan. At such a place, the coefficient determining section 23 adjusts the spatial frequency filter of the edge enhancing section 21 in the direction of strengthening the edge enhancement. Further, the coefficient determining section 23 adjusts the spatial frequency filter of the noise reducing section 20 in the direction of weakening the noise reduction.

In general, since a human being has a high visual sensitivity to a gradation change of green or cyan, the sharpness of the image can be effectively raised by the above adjustment. A green detailed portion such as bushes of leaves or a grassy plain can also be emphasized.

After the spatial frequency filter is adjusted in this way, the coefficient determining section 23 causes the operation to proceed to step S14.

Step 13: At this step, the average hue in the local area is red or yellow. At such a place, the coefficient determining section 23 adjusts the spatial frequency filter of the edge enhancing section 21 in the direction of weakening the edge enhancement. Further, the coefficient determining section 23 adjusts the spatial frequency filter of the noise reducing section 20 in the direction of strengthening the noise reduction.

By the adjustment, uneven hue (turbidity of color) which is apt to be noticeable in a place with red or yellow can be certainly improved for the better.

After the spatial frequency filter is adjusted in this way, the coefficient determining section 23 causes the operation to proceed to step S14.

Step S14: The coefficient determining section 23 checks the correspondence relation stored in the correspondence setting section 24, and judges whether the average luminance information falls in a range of intermediate gradation.

It is preferable that the range of the intermediate gradation is set to the gradation range in which a harmful influence of the edge enhancement is low.

When the average luminance information falls in the range of the intermediate gradation, the coefficient determining section 23 causes the operation to proceed to step S15.

On the other hand, when the average luminance information is in the dark side of this range, the coefficient determining section 23 causes the operation to proceed to step S16.

Figure 5:
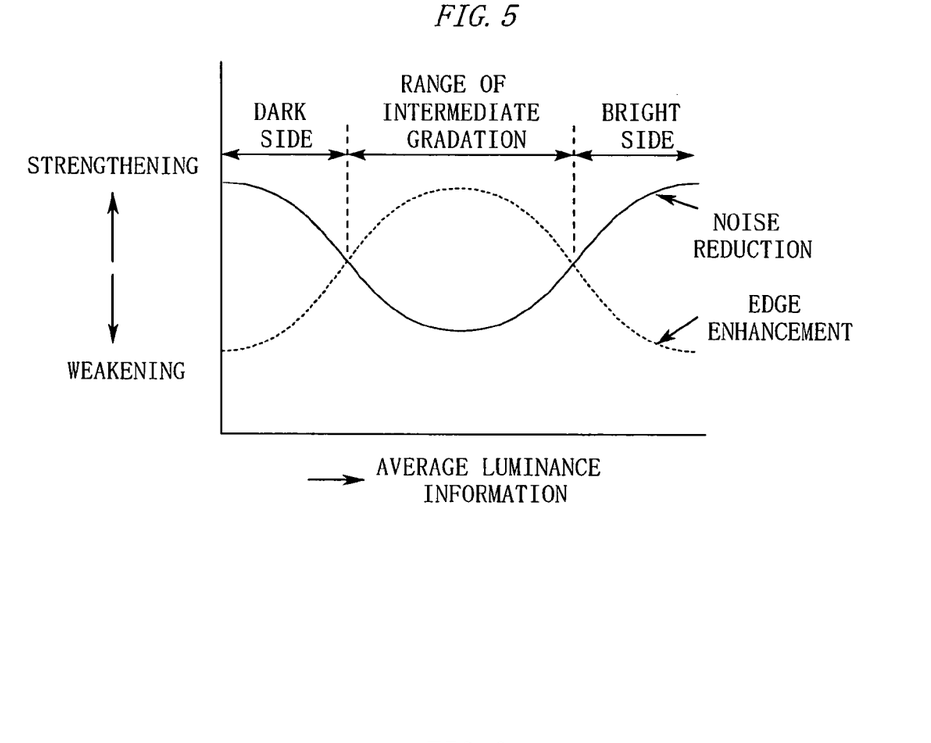
FIG. 5 is a view showing an example of an adjustment tendency.

Further, when the average luminance information is in the bright side of this range, the coefficient determining section 23 causes the operation to proceed to step S17.

step S15: In the case where the average luminance information falls in the range of the intermediate gradation, the coefficient determining section 23 adjusts the spatial frequency filter of the edge enhancing section 21 in the direction of strengthening the edge enhancement. Further, the coefficient determining section 23 adjusts the spatial frequency filter of the noise reducing section 20 in the direction of weakening the noise reduction (see FIG. 5).

As a result, with respect to an image with low contrast in which the brightness is converged to an intermediate gradation, the sharpness of the gradation change can be emphasized.

After the spatial frequency filter is adjusted in this way, the coefficient determining section 23 causes the operation to proceed to step S18.

Step S16: In the case where the average luminance information is in the dark side, the coefficient determining section 23 adjusts the spatial frequency filter of the edge enhancing section 21 in the direction of weakening the edge enhancement. Further, the coefficient determining section 23 adjusts the spatial frequency filter of the noise reducing section 20 in the direction of especially strengthening the noise reduction (see FIG. 5).

The noise of the dark part can be made unnoticeable by the adjustment as stated above.

After the adjustment of the spatial frequency filter is adjusted in this way, the coefficient determining section 23 causes the operation to proceed to step S18.

step S17: In the case where the average luminance information is in the bright side, the coefficient determining section 23 adjusts the spatial frequency filter of the edge enhancing section 21 in the direction of weakening the edge enhancement. Further, the coefficient determining section 23 adjusts the spatial frequency filter of the noise reducing section 20 in the direction of strengthening the noise reduction (see FIG. 5).

Such harmful influences that the signal level of the pixel signal is saturated in the bright part can be certainly prevented by the adjustment as stated above.

After the spatial frequency filter is adjusted in this way, the coefficient determining section 23 causes the operation to proceed to step S18.

Step S18: The coefficient determining section 23 checks the correspondence relation stored in the correspondence setting section 24, and evaluates and judges the degree of flatness in the local area.

Here, in the case where it is evaluated and judged that the degree of flatness is low, the coefficient determining section 23 causes the operation to proceed to step S19.

On the other hand, in the case where it is evaluated and judged that the degree of flatness is high, the coefficient determining section 23 causes the operation to proceed to step S20.

Figure 6:
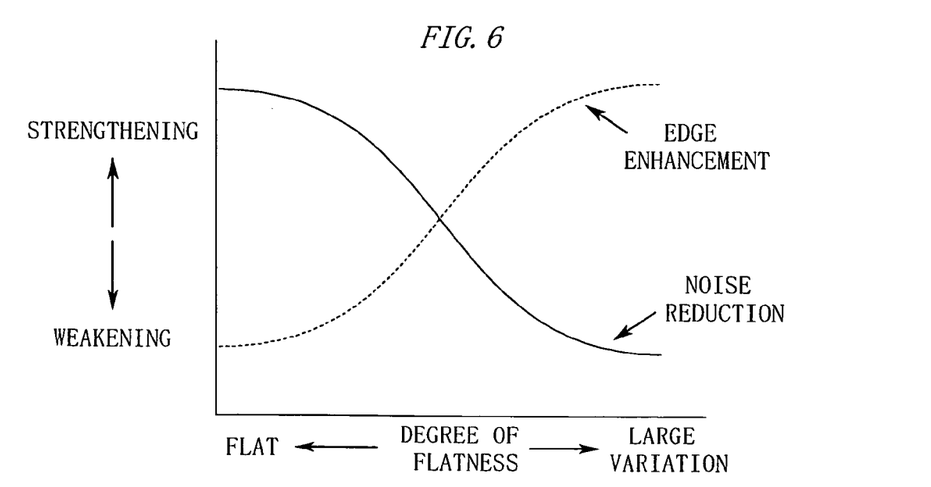
FIG. 6 is a view showing an example of an adjustment tendency.

Step S19: In the case where the degree of flatness is low, the coefficient determining section 23 adjusts the spatial frequency filter of the edge enhancing section 21 in the direction of strengthening the edge enhancement. Further, the coefficient determining section 23 adjusts the spatial frequency filter of the noise reducing section 20 in the direction of weakening the noise reduction (see FIG. 6).

By the adjustment as stated above, the sharpness of the gradation change can be enhanced in a nonflat area such as a detailed part or an edge part.

Step S20: On the contrary, in the case where the degree of flatness is high, the coefficient determining section 23 adjusts the spatial frequency filter of the edge enhancing section 21 in the direction of weakening the edge enhancement. Further, the coefficient determining section 23 adjusts the spatial frequency filter of the noise reducing section 20 in the direction of strengthening the noise reduction (see FIG. 6).

By the adjustment as stated above, S/N of the flat area can be improved for the better.

<<Supplements of Embodiment>>

In the foregoing embodiment, the description has been given of the case in which the signal processing apparatus (the analyzing section 22, the coefficient determining section 23, the correspondence setting section 24, the noise reducing section 20 and the edge enhancing section 21) is mounted in the electronic camera 11. However, the invention is not limited to this. For example, the signal processing apparatus may be mounted in another color image equipment.

A signal processing program may be created which causes a computer to function as the signal processing part (the noise reducing section 20 and/or the edge enhancing section 21), and the coefficient correcting section (the analyzing section 22, the coefficient determining section 23, and the correspondence setting section 24). By using the signal processing program, it becomes possible to perform a signal processing suitable for image data (especially RAW data) on the computer.

Further, in the foregoing embodiment, with respect to the correspondence relation set beforehand in the correspondence setting section 24, anything may be used as long the "correct coefficient group" can be specified by checking the feature information (for example, average luminance information, average color information, and degree of flatness) in the local area. For example, as the correspondence relation, a lookup table may be used in which selected numbers of the correct coefficient group are made to correspond to the feature information in the local areas and are stored. Besides, for example, as the correspondence relation, arithmetic expressions for calculating the correction amount of the correct coefficient group from the feature information may be used.

In the foregoing embodiment, the noise reducing section 20 and the edge enhancement 21 are separately provided, and the respective spatial frequency filters are independently adjusted. However, the invention is not limited to this. For example, by adjusting the coefficient group of one spatial frequency filter, it is also possible to apply the noise reduction and the edge enhancement selectively or mixedly to the pixel signal.

The invention is not limited to the above embodiments and various modifications may be made without departing from the spirit and scope of the invention. Any improvement may be made in part or all of the components.

What is claimed is:

1. A signal processing apparatus comprising:
    a signal processing section applying a spatial frequency filter to an inputted pixel signal to perform a signal processing of noise reduction and/or edge enhancement; and
    a coefficient correcting section setting a coefficient group of the spatial frequency filter to a correct coefficient group,
    wherein the coefficient correcting section includes
    an analyzing section which sets a local area to include an object pixel of the signal processing, and processes plural pixel signals in the local area to obtain average color information,
    a correspondence setting section in which a correspondence relation between the average color information and the correct coefficient group is set beforehand; and
    a coefficient determining section which checks the correspondence relation on the basis of the average color information obtained by the analyzing section, and adjusts the correct coefficient group used for the pixel of the processing object.

2. The signal processing apparatus according to claim 1, wherein the coefficient correcting section adjusts the correct coefficient group in a direction of strengthening the edge enhancement when an average hue in the local area including the pixel of the processing object is green or cyan, and adjusts the correct coefficient group in a direction of strengthening the noise reduction when the average hue is red or yellow.

3. A signal processing program embodied in a computer readable medium causing a computer to function as the signal processing section and the coefficient correcting section according to claim 1.

4. An electronic camera comprising:
an image pickup section taking an image of a subject to generate a pixel signal; and
a signal processing apparatus according to claim 1,
wherein the signal processing apparatus performs the signal processing for the pixel signal generated by the image pickup section.

5. A signal processing apparatus comprising:
a signal processing section applying a spatial frequency filter to an inputted pixel signal to perform a signal processing of noise reduction and/or edge enhancement; and
a coefficient correcting section setting a coefficient group of the spatial frequency filter to a correct coefficient group,
wherein the coefficient correcting section includes
an analyzing section which sets a local area to include an object pixel of the signal processing, and processes plural pixel signals in the local area to obtain average luminance information,
a correspondence setting section in which a correspondence relation between the average luminance information and the correct coefficient group is set beforehand, and
a coefficient determining section which checks the correspondence relation on the basis of the average luminance information obtained by the analyzing section, and adjusts the correct coefficient group used for the pixel of the processing object.

6. The signal processing apparatus according to claim 5, wherein the coefficient correcting section adjusts the correct coefficient group in a direction of strengthening the edge enhancement when the average luminance in the local area including the pixel of the processing object falls in a predetermined range of an intermediate gradation, and adjusts the correct coefficient group in a direction of strengthening the noise reduction at other times.

7. A signal processing program embodied in a computer readable medium causing a computer to function as the signal processing section and the coefficient correcting section according to claim 5.

8. An electronic camera comprising:
an image pickup section taking an image of a subject to generate a pixel signal; and
a signal processing apparatus according to claim 5,
wherein the signal processing apparatus performs the signal processing for the pixel signal generated by the image pickup section.

9. A signal processing apparatus comprising:
a signal processing section applying a spatial frequency filter to an inputted pixel signal to perform a signal processing of noise reduction and/or edge enhancement; and
a coefficient correcting section setting a coefficient group of the spatial frequency filter to a correct coefficient group,
wherein the coefficient correcting section includes
an analyzing section which sets a local area to include an object pixel of the signal processing, and processes plural pixel signals in the local area to obtain a degree of flatness in a pixel space,
a correspondence setting section in which a correspondence relation between the degree of flatness and the correct coefficient group is set beforehand, and
a coefficient determining section which checks the correspondence relation on the basis of the degree of flatness obtained by the analyzing section, and adjusts the correct coefficient group used for the pixel of the processing object.

10. The signal processing apparatus according to claim 9, wherein the coefficient correcting section adjusts the correct coefficient group in a direction of strengthening the noise reduction as the degree of flatness in the local area including the pixel of the processing object becomes high, and adjusts the correct coefficient group in a direction of strengthening the edge enhancement as the degree of flatness becomes low.

11. A signal processing program embodied in a computer readable medium causing a computer to function as the signal processing section and the coefficient correcting section according to claim 9.

12. An electronic camera comprising:
an image pickup section taking an image of a subject to generate a pixel signal; and
a signal processing apparatus according to claim 9,
wherein the signal processing apparatus performs the signal processing for the pixel signal generated by the image pickup section.

13. A signal processing apparatus comprising:
a signal processing section applying a spatial frequency filter to an inputted pixel signal to perform a signal processing of noise reduction and/or edge enhancement; and
a coefficient correcting section setting a coefficient group of the spatial frequency filter to a correct coefficient group,
wherein the coefficient correcting section includes
an analyzing section which sets a local area to include an object pixel of the signal processing, and calculates average color information and a degree of flatness on the basis of plural pixel signals in the local area,
an aberration judging section which judges whether conditions of
(1) the average color information falls in a hue range of one of green and magenta, and
(2) the degree of flatness is lower than a previously determined threshold and indicates a color boundary or an edge part
are satisfied, and
a coefficient determining section which adjusts the correct coefficient group used for the pixel of the processing object in a direction of strengthening the noise reduction and/or a direction of weakening the edge enhancement, when the conditions are satisfied in the aberration judging section.

14. A signal processing program embodied in a computer readable medium causing a computer to function as the signal processing section and the coefficient correcting section according to claim 13.

15. An electronic camera comprising:
an image pickup section taking an image of a subject to generate a pixel signal; and
a signal processing apparatus according to claim 13,
wherein the signal processing apparatus performs the signal processing for the pixel signal generated by the image pickup section.

16. A signal processing apparatus comprising:
a signal processing section applying a spatial frequency filter to an inputted pixel signal to perform a signal processing of noise reduction and/or edge enhancement; and
a coefficient correcting section setting a coefficient group of the spatial frequency filter to a correct coefficient group,
wherein the coefficient correcting section includes
an analyzing section which sets a local area to include an object pixel of the signal processing, and calculates average color information, average luminance information and a degree of flatness on the basis of plural pixel signals in the local area,
a skin judging section which judges whether conditions of
(1) the average color information falls in a previously determined hue range of a flesh color,
(2) the average luminance information falls in a brightness range of a skin, and
(3) the degree of flatness indicates a flatter state than a previously determined threshold and falls in a range of degree of flatness of the skin
are satisfied, and
a coefficient determining section which adjusts the correct coefficient group used for the pixel of the processing object in a direction of strengthening the noise reduction and/or a direction of weakening the edge enhancement, when the conditions are satisfied in the skin judging section.

17. A signal processing program embodied in a computer readable medium causing a computer to function as the signal processing section and the coefficient correcting section according to claim 16.

18. An electronic camera comprising:
an image pickup section taking an image of a subject to generate a pixel signal; and
a signal processing apparatus according to claim 16,
wherein the signal processing apparatus performs the signal processing for the pixel signal generated by the image pickup section.

19. A signal processing apparatus comprising:
a signal processing section applying a spatial frequency filter to an inputted pixel signal to perform a signal processing of noise reduction and/or edge enhancement; and
a coefficient correcting section setting a coefficient group of the spatial frequency filter to a correct coefficient group,
wherein the coefficient correcting section includes
an analyzing section which sets a local area to include an object pixel of the signal processing, and calculates average color information, average luminance information and degree of flatness on the basis of plural pixel signals in the local area,
a blue sky judging section which judges whether conditions of
(1) the average color information falls in a previously determined hue range of a blue sky,
(2) the average luminance information indicates a brighter state than a previously determined threshold and falls in a brightness range of the blue sky, and
(3) the degree of flatness indicates a flatter state than a previously determined threshold and falls in a range of the degree of flatness of the blue sky
are satisfied; and
a coefficient determining section which adjusts the correct coefficient group used for the pixel of the processing object in a direction of strengthening the noise reduction and/or a direction of weakening the edge enhancement, when the conditions are satisfied in the blue sky judging section.

20. A signal processing program embodied in a computer readable medium causing a computer to function as the signal processing section and the coefficient correcting section according to claim 19.

21. An electronic camera comprising:
an image pickup section taking an image of a subject to generate a pixel signal; and
a signal processing apparatus according to claim 19,
wherein the signal processing apparatus performs the signal processing for the pixel signal generated by the image pickup section.

22. A signal processing apparatus comprising:
a signal processing section applying a spatial frequency filter to an inputted pixel signal to perform a signal processing of noise reduction and/or edge enhancement; and
a coefficient correcting section setting a coefficient group of the spatial frequency filter to a correct coefficient group,
wherein the coefficient correcting section includes
an analyzing section which sets a local area to include an object pixel of the signal processing, and calculates local feature information in the local area including at least one of average color information, average luminance information and degree of flatness on the basis of plural pixel signals in the local area;
a correspondence setting section in which a correspondence relation between the local feature information and the correct coefficient group is set beforehand; and
a coefficient determining section which checks the correspondence relation on the basis of the local feature information obtained by the analyzing section, and adjusts the correct coefficient group used for the pixel of the processing object.

23. A signal processing program embodied in a computer readable medium causing a computer to function as the signal processing section and the coefficient correcting section according to claim 22.

24. An electronic camera comprising:
an image pickup section taking an image of a subject to generate a pixel signal; and
a signal processing apparatus according to claim 22,
wherein the signal processing apparatus performs the signal processing for the pixel signal generated by the image pickup section.

* * * * *